(12) United States Patent
Wang et al.

(10) Patent No.: US 12,242,603 B2
(45) Date of Patent: Mar. 4, 2025

(54) SYSTEM AND METHOD FOR DYNAMIC SCORING OF INCIDENTS

(71) Applicant: Stellar Cyber, Inc., San Jose, CA (US)

(72) Inventors: Qi Wang, Champaign, IL (US); Zhichun Li, Santa Clara, CA (US); Jiaping Gui, Shanghai (CN); Shuchu Han, Princeton Junction, NJ (US)

(73) Assignee: Stellar Cyber, Inc, San Jose, CA (US)

( * ) Notice: Subject to any disclaimer, the term of this patent is extended or adjusted under 35 U.S.C. 154(b) by 244 days.

(21) Appl. No.: 18/155,031

(22) Filed: Jan. 16, 2023

(65) Prior Publication Data
US 2024/0241949 A1    Jul. 18, 2024

(51) Int. Cl.
*G06F 21/55* (2013.01)
(52) U.S. Cl.
CPC ...... *G06F 21/554* (2013.01); *G06F 2221/034* (2013.01)
(58) Field of Classification Search
CPC ......... G06F 2221/033; G06F 2221/034; G06F 21/554
See application file for complete search history.

(56) References Cited

U.S. PATENT DOCUMENTS

| 2015/0154501 A1* | 6/2015 | Boddhu | G06N 20/00 706/52 |
| 2021/0084057 A1* | 3/2021 | Chhabra | H04L 63/1416 |
| 2021/0152575 A1* | 5/2021 | Mistry | H04L 63/1408 |
| 2021/0194896 A1* | 6/2021 | Seymour | G06F 11/3072 |
| 2023/0224311 A1* | 7/2023 | Meshi | H04L 41/0609 726/22 |

OTHER PUBLICATIONS

Milajerdi et al., "Holmes: real-time apt detection through correlation of suspicious information flows," 2019 IEEE Symposium on Security and Privacy (SP), pp. 1137-1152. IEEE, 2019.
Hassan et al., "Tactical provenance analysis for endpoint detection and response systems," 2020 IEEE Symposium on Security and Privacy (SP), pp. 1172-1189. IEEE, 2020.

* cited by examiner

*Primary Examiner* — Jonathan A Bui
(74) *Attorney, Agent, or Firm* — Stellar IP (57) ABSTRACT

The disclosure provides a system, a method and a computer program product for dynamic scoring of a plurality of incidents. The system is configured to retrieve an incident of the plurality of incidents. The incident comprises at least one alert and is associated with a security breach. The system further generates an enriched alert based on enrichment of the at least one alert. The enrichment is based on security related data of the security breach. The system further identifies one or more entities and one or more observables associated with the generated enriched alert. The system determines a score for the retrieved incident based on at least the generated enriched alert and the generated behavioural entity model. The system is further configured to dynamically update the determined score for the retrieved incident based on an analysis of at least the retrieved incident and the generated behavioural entity model.

18 Claims, 8 Drawing Sheets

SYSTEM AND METHOD FOR DYNAMIC SCORING OF INCIDENTS

TECHNICAL FIELD

The present disclosure generally relates to machine learning based security alert incident management, and more particularly relates to a system and a method for dynamic scoring of incidents.

BACKGROUND

Nowadays, there are several tools and platforms, such as, Endpoint Detection and Response (EDR) and Network Detection and Response (NDR), for detecting threats and cyber-attacks. These tools and platforms raise threat alerts if potentially malicious behaviors are observed. To combat alert fatigue from multiple threat alerts raised by those tools and platforms, security analysts may use manual ways to create security incidents from the threat alerts. A security incident correlates related alerts together so that the security analysts can review and validate a set of related alerts together instead of examining potentially unrelated alerts individually. After an incident is created, a cyber-security analyst investigates the context around the security incident and takes proper actions to minimize the impacts of the security incident. As the resources and time of security analysts are limited, it is important for them to prioritize their efforts to respond to more severe security incidents first instead of manually going through every alert or incident (alert group).

In addition, it is a tedious task for security analysts to manually analyze the security incidents. Also, manual analyzing of the security incidents is time consuming. To overcome the mentioned disadvantages, there exists a need for a system that helps the users such as the security analysts prioritize management of the security incidents.

SUMMARY

It is required to provide a system or a method that is able to dynamically update scoring of incidents to counter the problem discussed above.

In one aspect, a system for dynamic scoring of a plurality of incidents is disclosed. The system includes at least one non-transitory memory configured to store computer executable instructions and at least one processor. The at least one processor is configured to execute the computer executable instructions. The execution of the computer executable instructions causes at least one processor to retrieve an incident of the plurality of incidents. The incident comprises at least one alert. The incident is associated with a security breach. The execution of the computer executable instructions may further cause the at least one processor to an enriched alert based on enrichment of the at least one alert. The enrichment is based on security related data of the security breach associated with the retrieved incident. The execution of the computer executable instructions may further cause the at least one processor to identify one or more entities and one or more observables associated with the generated enriched alert. In addition, The execution of the computer executable instructions cause the at least one processor to generate a behavioral entity model based on at least the identified one or more entities and the one or more observables. Further, the at least one processor is configured to determine a score for the retrieved incident based on at least the generated enriched alert and the generated behavioral entity model. The at least one processor is configured dynamically update the determined score for the retrieved incident based on an analysis of at least the retrieved incident and the generated behavioral entity model.

In some embodiments, the at least one processor is further configured to identify predefined rules associated with the security related data of the security breach associated with the retrieved incident. The security related data corresponds to at least one of: a tactic of the security breach, a technique of the security breach, a kill chain stage of the security breach, a severity of the security breach, a fidelity associated with the at least one alert, or a likelihood of successfulness of the security breach. The at least one processor is configured to enrich the at least one alert based on the identified predefined rules.

In some embodiments, for the enrichment of the at least one alert, the at least one processor is further configured to apply a machine learning (ML) model on the at least one alert, based on unsuccessful identification of the predefined rules, to output the enriched alert. The ML model is trained to enrich the at least one alert based on the security related data of the security breach associated with the retrieved incident.

In some embodiments, to identify the set of correlation features, the at least one processor is configured to utilize at least one of: a set of built-in features or a machine learning (ML) model to identify the one or more entities and the one or more observables associated with the generated enriched alert. The ML model is trained using natural language processing techniques to identify the one or more entities and observables associated with the generated enriched alert.

In some embodiments, the one or more entities and the one or more observables comprises at least one of: information of a user associated with the security breach, an asset associated with the security breach, an external host associated with the security breach a process associated with the security breach, a type of file associated with the security breach, or a registry associated with the security breach of the retrieved incident.

In some embodiments, to generate the behavioral entity model, the least one processor is further configured to utilize the identified one or more entities, the one or more observables, and monitoring data associated with the identified one or more entities and the one or more observables. The monitoring data comprises at least one of: vulnerability scanning data associated with the enriched alert, past data associated with the alert, and recent alerts associated with the retrieved incident.

In some embodiments, the least one processor is further configured to utilize at least one of: a response and feedback associated with a user of the system, or monitoring data associated with the system to determine the score of the retrieved incident.

In some embodiments, to determine the score of the retrieved incident, the at least one processor is further configured to: perform feature extraction of the retrieved incident using at least one of: the enriched alert associated with the retrieved incident, the generated behavioral entity model, a response and feedback associated with a user of the system, and an external intelligence data. In addition, the at least one processor is configured to apply the ML model to the extracted features of the retrieved incident to determine the score of the retrieved incident.

In some embodiments, to dynamically update the determined score, the at least one processor is further configured to monitor changes to at least one of: the retrieved incident, the behavioral entity model, and a response and feedback of a user of the system associated with the retrieved incident.

In a second aspect, a method for dynamic scoring of a plurality of is disclosed. The method includes retrieving an incident of the plurality of incidents. The incident includes at least one alert and is associated with a security breach. The method further includes generating an enriched alert based on enrichment of the at least one alert. The enrichment is based on security related data of the security breach associated with the retrieved incident. The method further includes identifying one or more entities and one or more observables associated with the generated enriched alert. Furthermore, the method includes generating a behavioral entity model based on at least the identified one or more entities and the one or more observables. Moreover, the method includes determining a score for the retrieved incident based on at least the generated enriched alert and the generated behavioral entity model. Also, the method includes dynamically updating the determined score for the retrieved incident based on an analysis of at least the retrieved incident and the generated behavioral entity model.

In a third aspect, a computer programmable product is disclosed. The computer programmable product includes a non-transitory computer readable medium having stored thereon computer executable instruction which when executed by at least one processor, cause the at least one processor to carry out operations for dynamic scoring of a plurality of incidents. The operations include retrieving an incident of the plurality of incidents. The incident includes at least one alert and is associated with a security breach. The operations further include generating an enriched alert based on enrichment of the at least one alert. The enrichment is based on security related data of the security breach associated with the retrieved incident. The operations further include identifying one or more entities and one or more observables associated with the generated enriched alert. Furthermore, the operations include generating a behavioral entity model based on at least the identified one or more entities and the one or more observables. Moreover, the operations include determining a score for the retrieved incident based on at least the generated enriched alert and the generated behavioral entity model. Also, the operations include dynamically updating the determined score for the retrieved incident based on an analysis of at least the retrieved incident and the generated behavioral entity model.

It is to be understood that both the foregoing summary and the following detailed description are exemplary and explanatory only and are not restrictive of the invention, as claimed.

BRIEF DESCRIPTION OF FIGURES

The accompanying drawings, which are incorporated in and constitute a part of this disclosure, illustrate exemplary embodiments and, together with the description, serve to explain the disclosed principles.

DETAILED DESCRIPTION

In the following description, for purposes of explanation, numerous specific details are set forth in order to provide a thorough understanding of the present disclosure.

It will be apparent, however, to one skilled in the art that the present disclosure can be practiced without these specific details. In other instances, systems, apparatuses, and methods are shown in block diagram form only in order to avoid obscuring the present disclosure.

Embodiments of the present invention provide a system, a method, and a computer program product for dynamic scoring of a plurality of incidents. The system may be a machine learning based system that solves "alert fatigue" problems by automatically generating a score for each of the plurality of incidents based on severity of the plurality of incidents so that security analysts may focus on more severe incidents first automatically instead of manually going through every incident of the plurality of incidents. In addition, the score is dynamically updated based on any changes identified in the plurality of incidents. These and other technical improvements of the invention will become evident from the description provided herein.

The system, the method, and the computer program product facilitating automated incident generation are described with reference to FIG. 1A to FIG. 3.

Figure 1A:
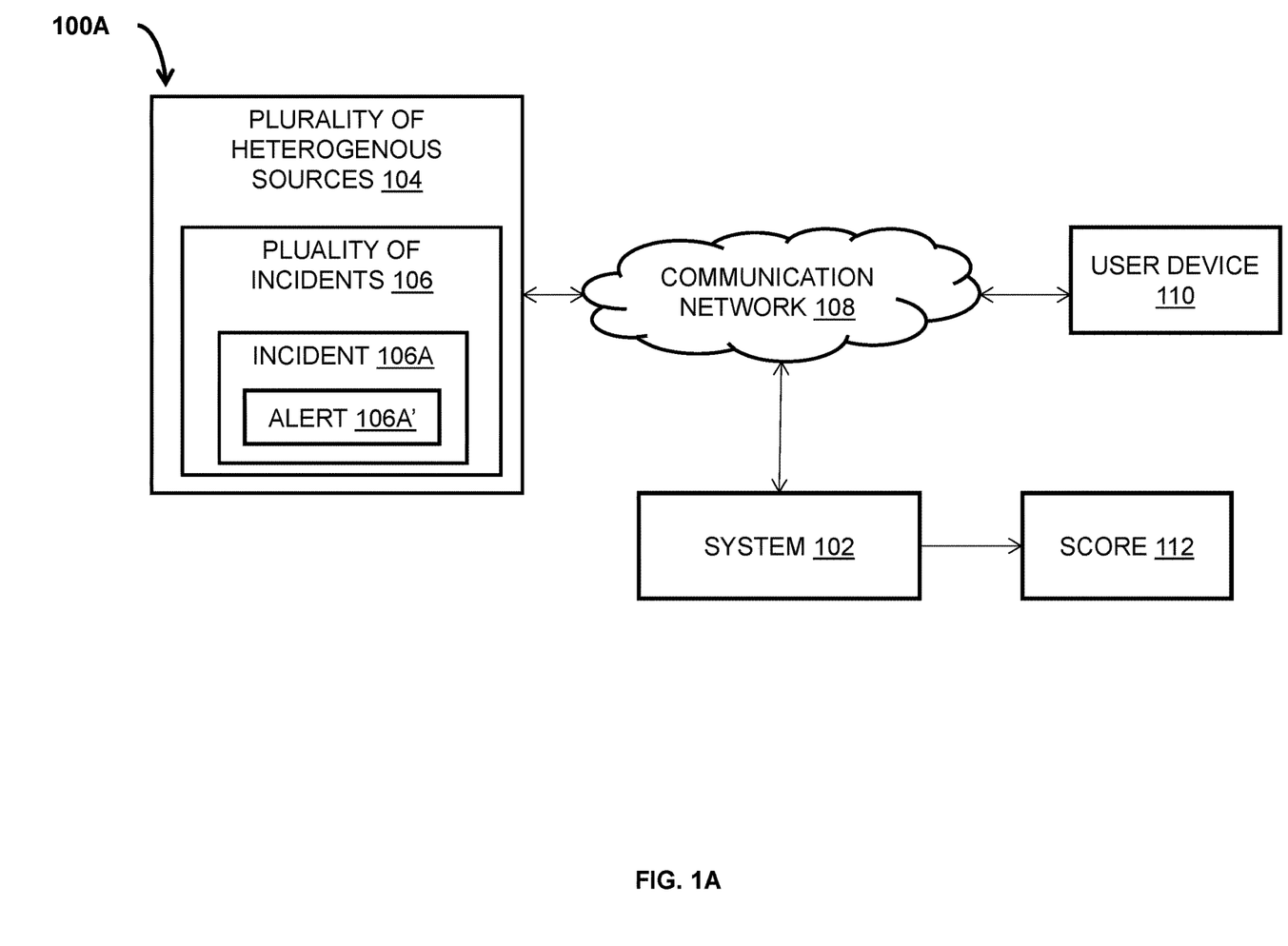
FIG. 1A illustrates a network environment of a system for dynamic scoring of a plurality of incidents, in accordance with an example embodiment.

FIG. 1A illustrates a network environment 100A of a system 102 for dynamic scoring of an incident 106A of a plurality of incidents 106, in accordance with an example embodiment. The system 102 may be communicatively coupled to a plurality of heterogeneous sources 104, and a user device 110 via a communication network 108. The system 102 may be communicatively coupled to the plurality of heterogeneous sources 104 to receive a plurality of alerts from the plurality of heterogeneous sources 104. The plurality of alerts may be associated with in the plurality of incidents 106. The system 102 further retrieves the incident 106A of the plurality of incidents 106.

The components described in the network environment 100 may be further broken down into more than one component such as an application in the system 102, one or more databases and/or combined together in any suitable arrangement. Further, it is possible that one or more components may be rearranged, changed, added, and/or removed without deviating from the scope of the present disclosure.

In an example embodiment, the system 102 may be embodied in one or more of several ways as per the required implementation. For example, the system 102 may be embodied as a cloud-based service, a cloud-based application, a remote server-based service, a remote server-based application, a virtual computing system, a remote server platform or a cloud-based platform. As such, the system 102 may be configured to operate outside the user device 110. However, in some example embodiments, the system 102 may be embodied within the user device 110, for example as an application in a mobile device and the like. In each of such embodiments, the system 102 may be communicatively coupled to the components shown in FIG. 1A to carry out the desired operations and wherever required modifications may be possible within the scope of the present disclosure. The system 102 may be implemented in enterprises or security industries to clarify overall security posture and to combat alert fatigue. Further, in one embodiment, the system 102 may be a standalone unit configured to perform dynamic scoring of the plurality of incidents 106.

The at least one alert 106A' (hereinafter alert 106A') may correspond to a notification or a warning that may be retrieved by the system 102. The alert 106A may be associated with a malicious activity for example, a security breach associated with cyber-security. The alert 106A' may indicate that the security breach may have taken place that may be threatening the security of an entity (such as an organization or an enterprise). In some embodiments, the alert 106A' may be categorized as a low risk alert, medium risk alert or high risk alert. For example, the low risk alert may correspond to instances such as detection of low risk viruses. The medium risk alert may correspond to for example, identification of exploitation of a critical vulnerability that may have a potential for significant damage to the security of the entity. The high risk alert may correspond to instance for example, complete network failure of the entity.

It may be noted that the incident 106A of the plurality of incidents 106 may be utilized to reduce or eliminate the alert fatigue for the user. The incident 106A may be generated by correlation of one or more alerts (such as the alert 106A'). The incident 106A may further include analyzed information of the alert 106A'. For example, the incident 106A may include a description of one or more alerts and a timeline of the reception of the one or more alerts.

The incident 106A may be associated with an event of a security breach such as a cyber-attack (as explained above). In an embodiment, the incident 106A may correspond to an event of a cyber-attack. The event of the cyber-attack includes but may not be limited to packet sniffer, phishing, and rootkit. In general, packet sniffer is an event of cyber-attack in which a passive receiver records a copy of every packet. By placing the passive receiver in the vicinity of the wireless transmitter, the passive receiver can obtain a copy of every packet that is transmitted. These packets include various types of sensitive information, including passwords, social security numbers, trade secrets, and private personal messages. Further, phishing generally refers to a fraudulent practice of sending emails or text messages purporting to be from reputable companies in order to induce individuals to reveal personal data, such as passwords and credit and/or debit card numbers. In addition, rootkit is a dangerous malware that is designed to benefit administrative rights and get the right of entry to a community tool. Once installed, attackers have completed an unrestricted right of entry to the tool and can, therefore, execute any movement including spying on customers or stealing exclusive data with no hindrance. The incident 106A may not be limited to the above-mentioned events.

In some example embodiments, the user device 110 may be any user accessible device such as a mobile phone, a smartphone, a portable computer, and the like. In some example embodiments, the user device 110 may be associated, coupled, or otherwise integrated with the system 102 to facilitate dynamic scoring of the incident 106A. The user device 110 may be used by a user associated with the system 102. The user associated with the system 102 is any person or group of persons that operates the system 102. The user may correspond to security analyst, administrator, and the like. In one embodiment, the user device 110 may be directly coupled to the system 102 via the communication network 108. The system 102 utilizes the incident 106 to generate an enriched alert that is further utilized to determine a score 112 of the incident 106A. In an example, the user device 110 may be used by the user to view the score 112 of the incident 106A. In some example embodiments, the user device 110 may serve the dual purpose of a data gatherer and a beneficiary device.

The communication network 108 may be wired, wireless, or any combination of wired and wireless communication networks, such as cellular, Wi-Fi, internet, local area networks, or the like. In one embodiment, the communication network 108 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. In an embodiment the communication network 108 is coupled directly or indirectly to the user device 110. In an example embodiment, the system 102 may be integrated in the user device 110 via the communication network 108.

In operation, the system 102 can be configured to retrieve the incident 106A that comprises the alert 106A'. In addition, the system 102 is configured to perform enrichment of the alert 106A' to generate an enriched alert. The enrichment is based on the security related data of the security breach associated with the retrieved incident 106A. Further, the system 102 is configured to identify one or more entities and one or more observables associated with the generated enriched alert. In an example, the one or more entities and the one or more observables includes at least one of: information of a user associated with the security breach, an asset associated with the security breach, an external host associated with the security breach, a process associated with the security breach, a type of file associated with the security breach, or a registry associated with the security breach of the retrieved incident 106A. The system 102 is further configured to generate a behavioral entity model (explained in FIG. 1B) based on at least the identified one or more entities and the one or more observables. Based on the generation of the behavioral entity model, the system 102 determines the score 112 for the retrieved incident 106A. Furthermore, the system 102 is configured to dynamically update the determined score 112 for the retrieved incident 106A based on an analysis of at least the retrieved incident and the generated behavioral entity model. The system 102 will be further explained in detail in connection with FIG. 1B.

Figure 1B:
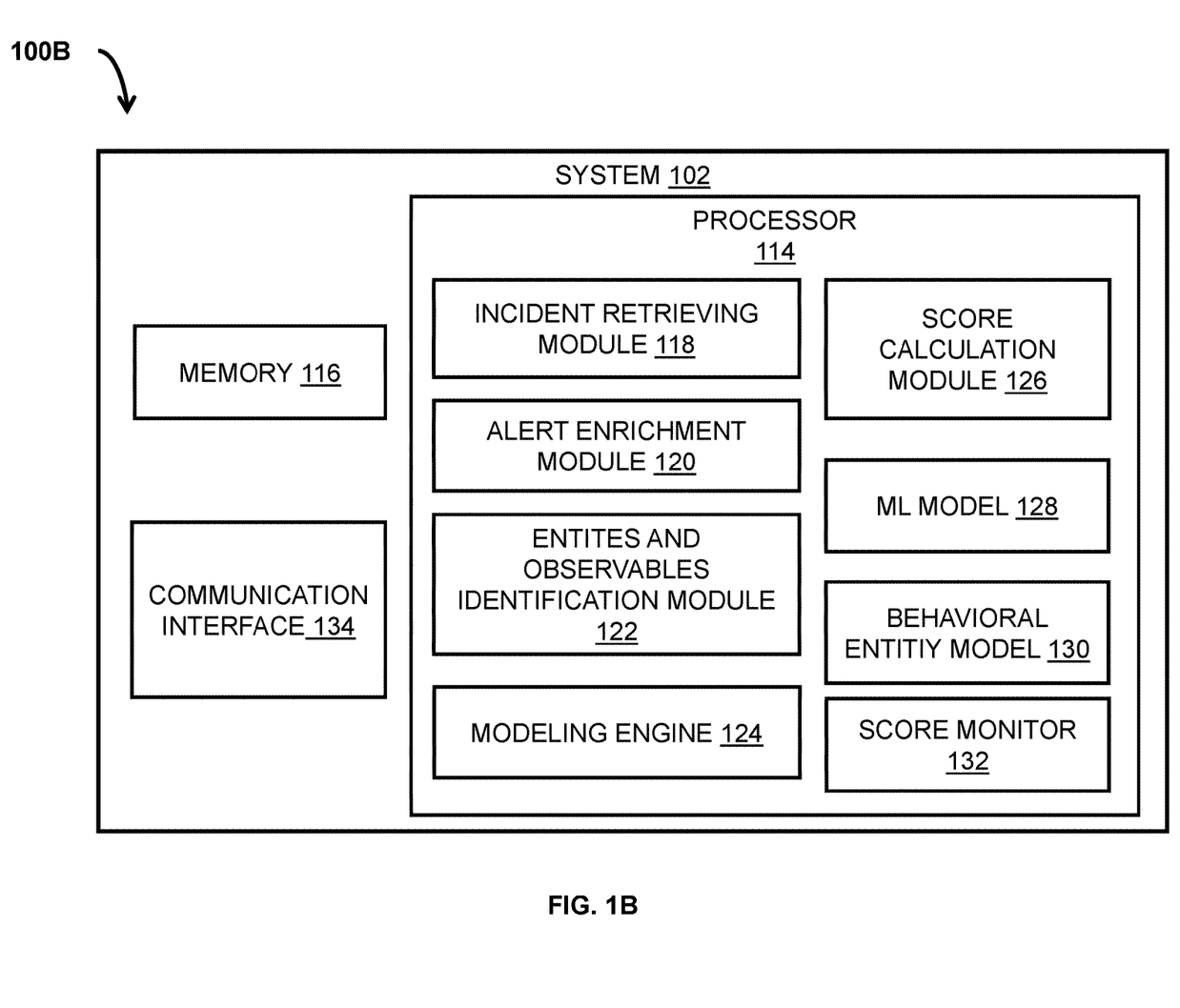
FIG. 1B illustrates a block diagram of the system for dynamic scoring of the plurality of incidents, in accordance with an example embodiment.

FIG. 1B illustrates a block diagram 100B of the system 102 for dynamic scoring of the plurality of incidents 106, in accordance with an example embodiment. The system 102 include at least one memory 116 (hereinafter, also referred to as "memory 116"), at least one processor 114 (hereinafter, also referred to as "processor 114"), and a communication interface 134.

The processor 114 may include an incident retrieving module 118, an alert enrichment module 120, entities and observables identification module 122, a modeling engine 124, a score calculation module 126, a machine learning (ML) model 128 (herein after the ML model 128), a behavioral entity model 130, and a score monitor 132. The processor 114 may retrieve computer executable instructions that may be stored in the memory 116 for execution of the computer executable instructions.

The processor 114 may be embodied in a number of different ways. For example, the processor 114 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 114 may include one or more processing cores configured to perform tasks independently. A multi-core processor may enable multiprocessing within a single physical package. Additionally, or alternatively, the processor 114 may include one or more processors configured in tandem via the bus to enable independent execution of instructions, pipelining and/or multithreading.

In some embodiments, the processor 114 may be configured to provide Internet-of-Things (IoT) related capabilities to the user associated with the system 102. In some embodiments, the user may be or correspond to security analysts (as explained above in FIG. 1A). The security analysts manage the plurality of incidents 106 generated by the plurality of heterogeneous sources 104. The IoT related capabilities may in turn be used to facilitate smart investigation tasks. The system 102 may be accessed using the communication interface 134. The communication interface 134 may provide an interface for accessing various features and data stored in the system 102.

Additionally, or alternatively, the processor 114 may include one or more processors capable of processing large volumes of workloads and operations to provide support for big data analysis. In an example embodiment, the processor 114 may be in communication with the memory 116 via a bus for passing information among components coupled to the system 102.

The memory 116 may be non-transitory and may include, for example, one or more volatile and/or non-volatile memories. In other words, for example, the memory 116 may be an electronic storage device (for example, a computer readable storage medium) comprising gates configured to store data (for example, bits) that may be retrievable by a machine (for example, a computing device like the processor 114). The memory 116 may be configured to store information, data, content, applications, instructions, or the like, for enabling the system 102 to carry out various functions in accordance with an example embodiment of the present invention. For example, the memory 116 may be configured to buffer input data for processing by the processor 114.

As exemplarily illustrated in FIG. 1B, the memory 116 may be configured to store instructions for execution by the processor 114. As such, whether configured by hardware or software methods, or by a combination thereof, the processor 114 may represent an entity (for example, physically embodied in circuitry) capable of performing operations according to an embodiment of the present invention while configured accordingly. Thus, for example, when the processor 114 is embodied as an ASIC, FPGA or the like, the processor 114 may be specifically configured hardware for conducting the operations described herein. Alternatively, as another example, when the processor 114 is embodied as an executor of software instructions, the instructions may specifically configure the processor 114 to perform the algorithms and/or operations described herein when the instructions are executed. However, in some cases, the processor 114 may be a processor specific device (for example, a mobile terminal or a fixed computing device) configured to employ an embodiment of the present invention by further configuration of the processor 114 by instructions for performing the algorithms and/or operations described herein. The processor 114 may include, among other things, a clock, an arithmetic logic unit (ALU) and logic gates configured to support operation of the processor 114.

The processor 114 may be configured to retrieve the incident 106A of the plurality of incidents 106 from the plurality of heterogeneous sources 104 with facilitation of the incident retrieving module 118. The incident retrieving module 118 is configured to retrieve the incident 106A out of the plurality of incidents 106 generated from the plurality of heterogeneous sources 104. The plurality of heterogeneous sources 104 includes but may not be limited to firewall, endpoint detection and response (EDR) tool, and network detection and response (NDR) tool.

The processor 114 may be further configured to analyze the retrieved incident 106A and perform enrichment of the alert 106A' of the retrieved incident 106A using the alert enrichment module 120. Enrichment is based on security related data of the security breach associated with the retrieved incident 106A. The alert enrichment module 120 takes as input a raw alert (may be the alert 106A') and outputs an enriched alert. The alert enrichment module 120 identifies pre-defined rules associated with the security related data of the security breach associated with the raw alert. The alert enrichment module 120 is configured to apply the ML model 128 on the raw alert to enrich the raw alert with the security related data, based on unsuccessful identification of the pre-defined rules. The alert enrichment module 120 is further explained in detail in FIG. 2A.

The processor 114 may be further configured to identify one or more entities and one or more observables associated with the generated enriched alert with facilitation of the entities and observables identification module 122. The entities and observables identification module 122 utilizes at least one of a set of built-in features or the ML model 128 to identify the one or more entities and the one or more observables associated with the generated enriched alert. The entities and observables identification module 122 is further explained in detail in FIG. 2B.

In an embodiment, the processor 114 may be further configured to generate the behavioral entity module 130 with facilitation of the modeling engine 124. The modeling engine 124 utilizes the generated enriched alert and the identified one or more entities and the one or more observables to generate the behavioral entity model 130. The behavioral entity model 130 comprises vulnerability score, risk score, and stability score associated with the enriched alert of the incident 106A (further explained in FIG. 2C). In an embodiment, the behavioral entity model 130 generates multiple behavioral entity models when there are multiple enriched alerts. Further, the behavioral entity model 130 is utilized by the score calculation module 126 for determining the score 112 associated with the enriched alert of the incident 106A. The score calculation module 126 is further explained in detail FIG. 2D.

Figure 2A:
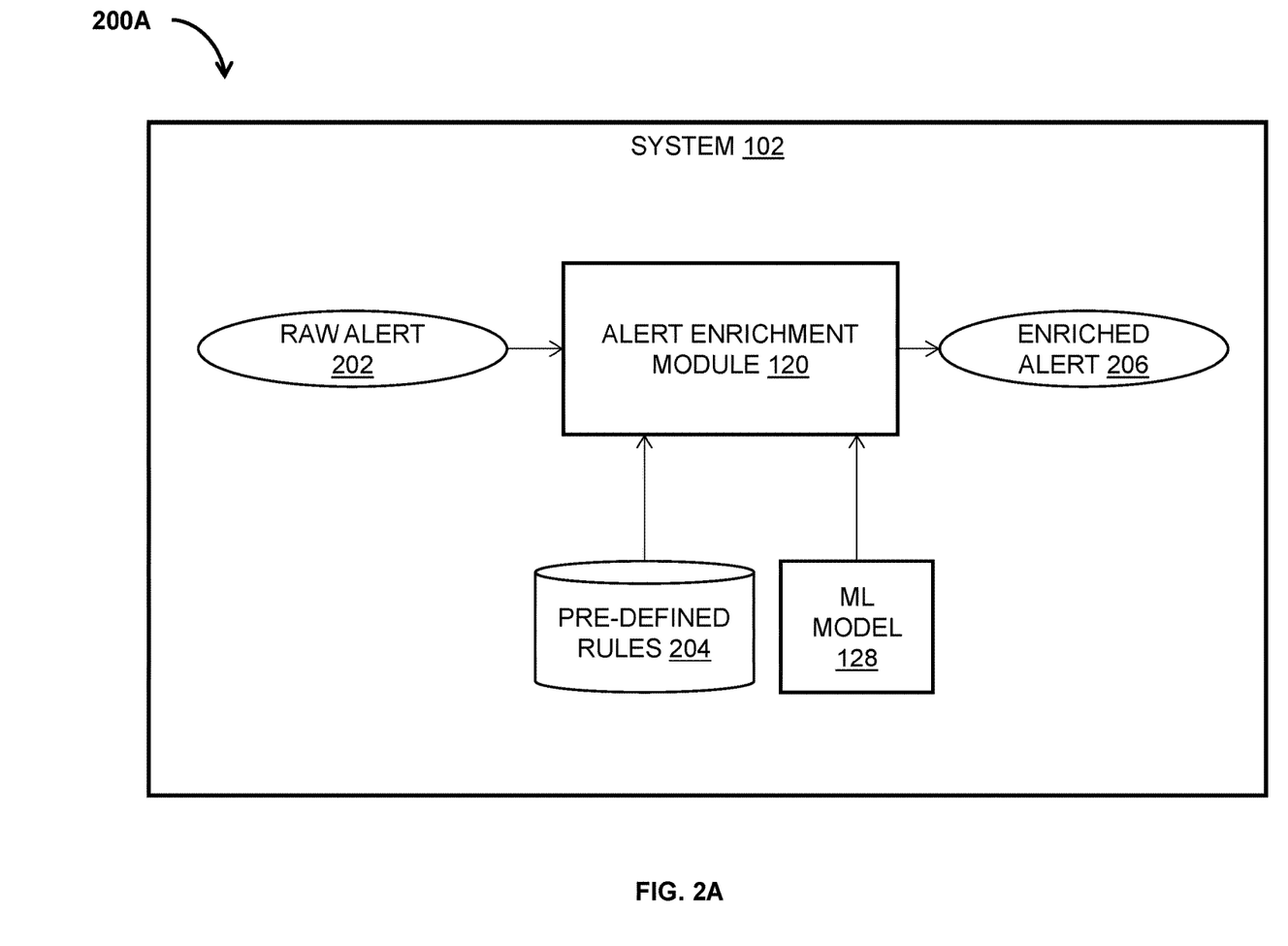
FIG. 2A illustrates a block diagram depicting generation of an enriched alert, in accordance with an example embodiment.
Figure 2B:
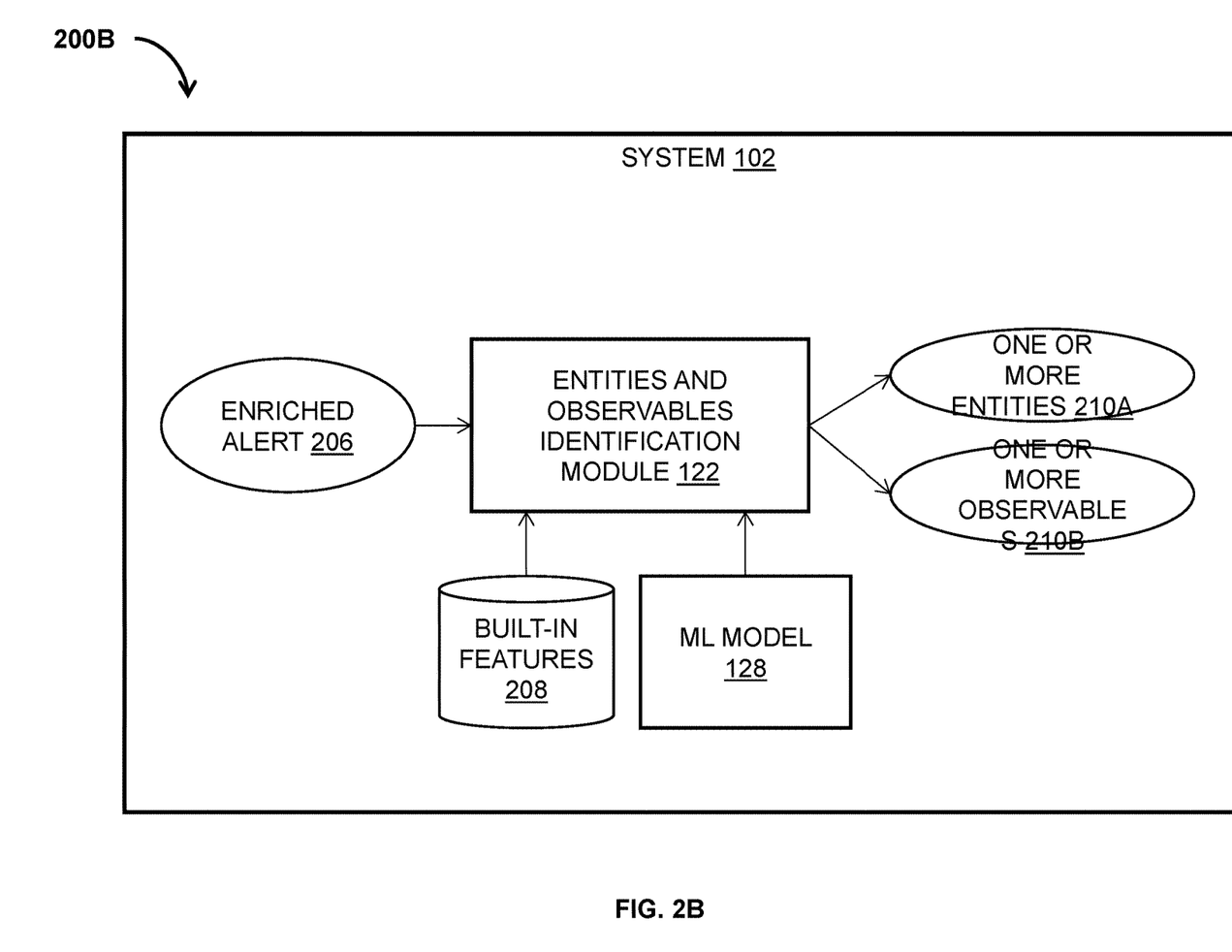
FIG. 2B illustrates a block diagram depicting identification of one or more entities and one or more observables, in accordance with an example embodiment.
Figure 2C:
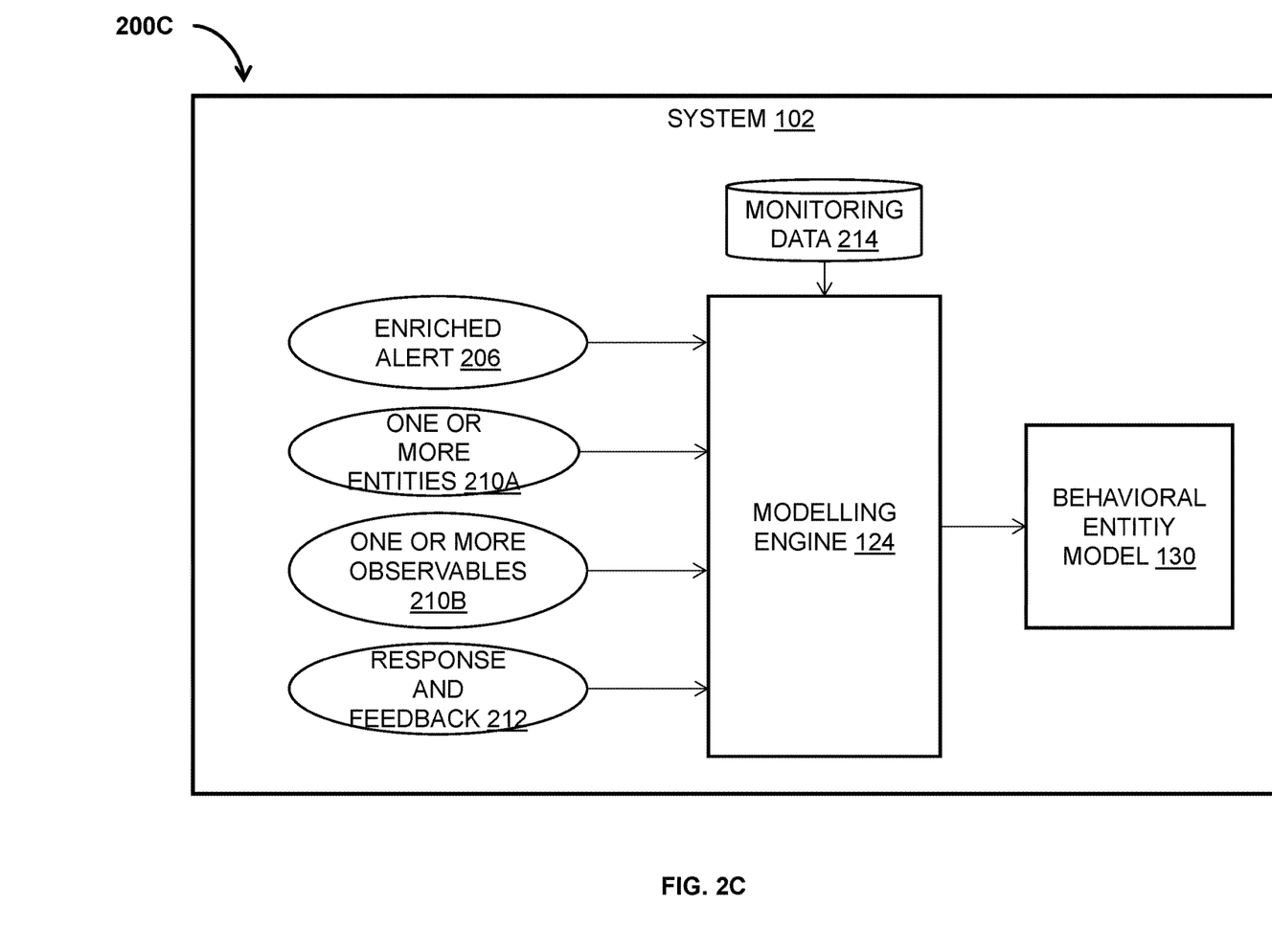
FIG. 2C illustrates a block diagram depicting generation of a behavioral entity model, in accordance with an example embodiment.
Figure 2D:
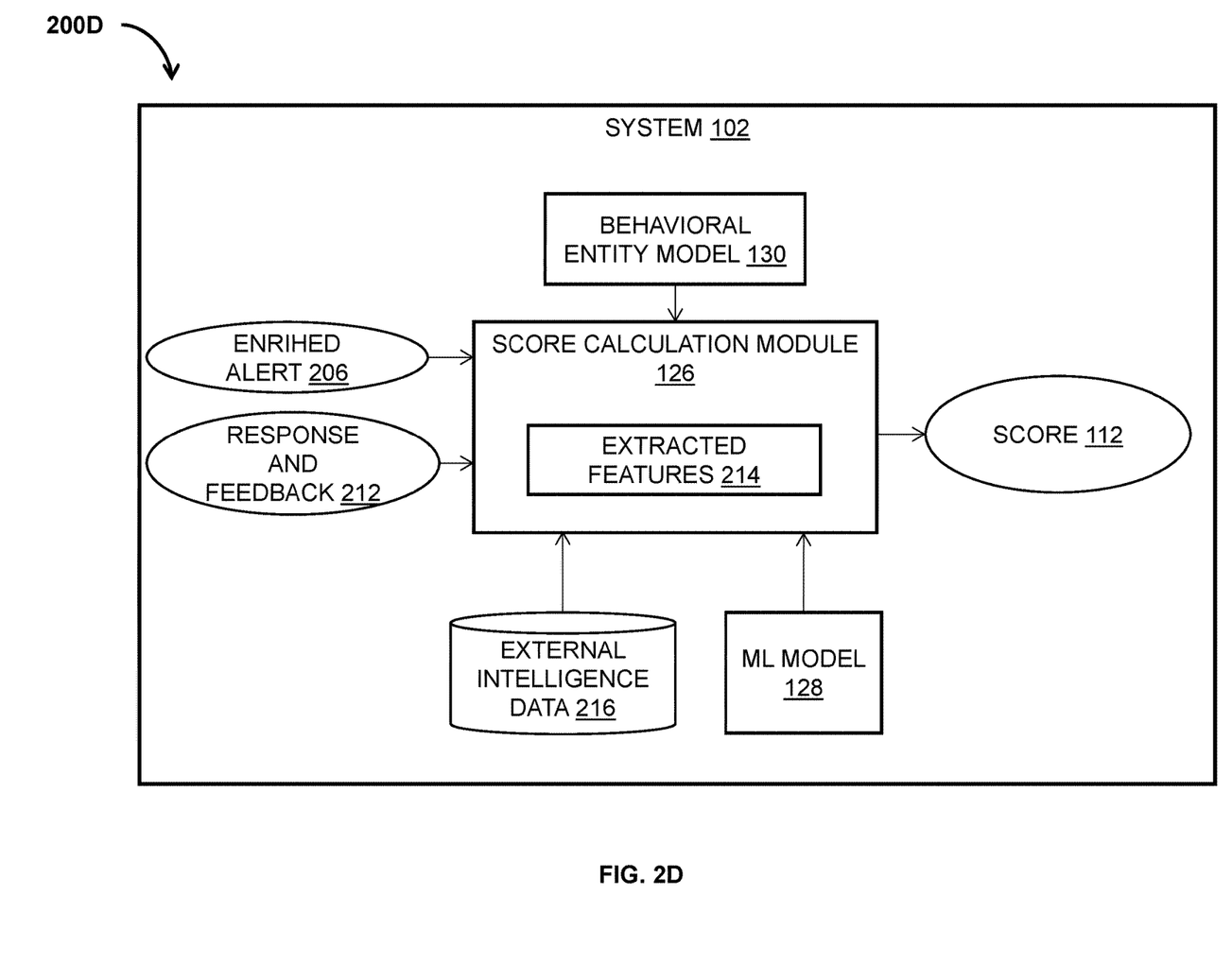
FIG. 2D illustrates a block diagram depicting generation of a score for a retrieved incident of the plurality of incidents, in accordance with an example embodiment.
Figure 2E:
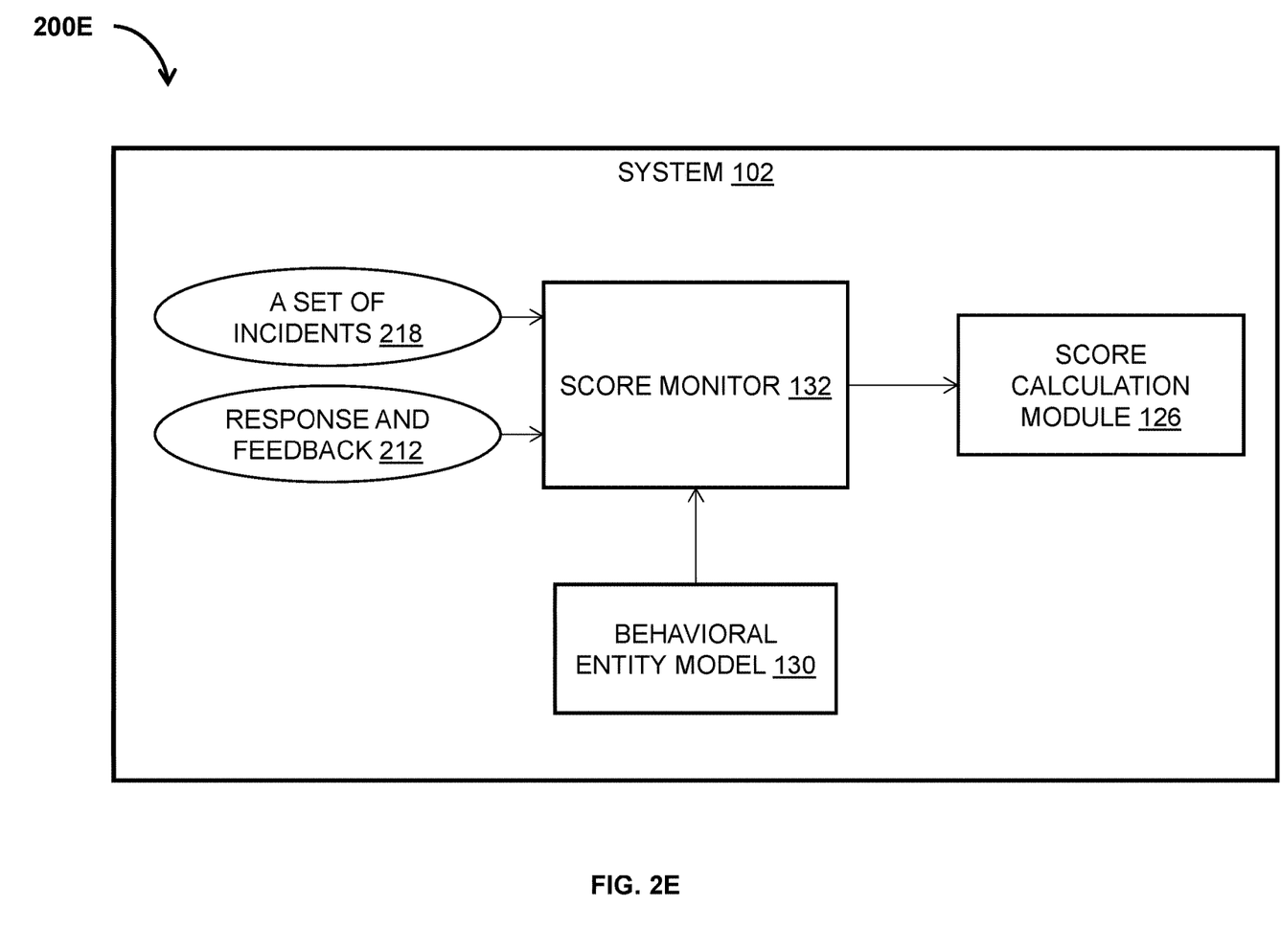
FIG. 2E illustrates a block diagram depicting monitoring of determined score for the retrieved incident, in accordance with an example embodiment.

The score monitor 132 may be configured to monitor changes in at least one of the retrieved incident 106A, the behavioral entity model 130, and response and feedback of the user associated with the system 102 for notifying the score calculation module 126 to reflect updated score of the incident 106A (further explained in FIG. 2E).

With reference to FIG. 1B, the system 102 includes the communication interface 134. The communication interface 134 may comprise input interface and output interface for supporting communications to and from the system 102 or any other component with which the system 102 may communicate. The communication interface 134 may be any means such as a device or circuitry embodied in either hardware or a combination of hardware and software that is configured to receive and/or transmit data to/from a communications device in communication with the user device 110. In this regard, the communication interface 134 may include, for example, an antenna (or multiple antennae) and supporting hardware and/or software for enabling communications with a wireless communication network. Additionally, or alternatively, the communication interface 134 may include the circuitry for interacting with the antenna(s) to cause transmission of signals via the antenna(s) or to handle receipt of signals received via the antenna(s). In some environments, the communication interface 134 may alternatively or additionally support wired communication. As such, for example, the communication interface 134 may include a communication modem and/or other hardware and/or software for supporting communication via cable, digital subscriber line (DSL), universal serial bus (USB) or other mechanisms for enabling the system 102 to carry out information exchange functions in many different forms of communication environments. The communication interface 134 enables exchange of information and instructions for dynamic scoring of the incident 106A.

FIG. 2A illustrates a block diagram 200A of the system 102 depicting generation of an enriched alert 206, in accordance with an example embodiment. The enriched alert 206 is generated using the alert enrichment module 120. The alert enrichment module 120 takes as input a raw alert 202 (may be the alert 106A' of FIG. 1A). The alert enrichment module 120 performs enrichment of the raw alert 202 to generate an enriched alert 206. The enrichment is based on the security related data of the security breach associated with the retrieved incident 106A.

The alert enrichment module 120 may identify predefined rules 204 associated with the security related data of the security breach associated with the raw alert 202. The security related data corresponds to at least one of a tactic of the security breach, a technique of the security breach, a kill chain stage of the security breach, scope of the security breach, or a severity of the security breach, a fidelity associated with the at least one alert, or a likelihood of successfulness of the security breach. The tactic of the security breach corresponds to a detected tactic of an attacker in the raw alert 202. The technique of the security breach corresponds to a technique used by an attacker in the raw alert 202. In general, kill chain corresponds to a step by step approach of an attack. The kill chain stage corresponds to a stage or step at which the attacker breaches the security. In addition, the scope of the security breach identifies whether the attack when the alert was raised is external or internal. The alert enrichment module 120 enriches the raw alert 202 based on the identified predefined rules 204.

In one embodiment, the alert enrichment module 120 may be configured to enrich the raw alert 202 based on the identified predefined rules 204. In an alternate embodiment, the alert enrichment module 120 may be configured to apply the ML model 128 on the raw alert 202 to enrich the raw alert 202 with the security related data, based on unsuccessful identification of the predefined rules 204.

The ML model 128 is applied on the raw alert 202 to output the enriched alert 206. For example, based on an Internet Protocol (IP) address of the hosts involved in an alert, scope of the alert can be identified. In general, IP address is a unique identifying number assigned to every single device that uses the Internet. The IP address identifies the host, or more specifically its network interface, and provides the location of the host in the network, and thus the capability of establishing a path to that host. The output of the alert enrichment module 120 is the enriched alert 206. The enriched alert 206 is further utilized by the entities and observables identification module 122 as explained in detail in FIG. 2B.

FIG. 2B illustrates a block diagram 200B of the system 102 depicting identification of one or more entities 210A and one or more observables 210B, in accordance with an example embodiment. The one or more entities 210A and the one or more observables 210B are identified using the entities and observables identification module 122. The entities and observables identification module 122 may be configured to utilize the enriched alert 206 as an input. In some embodiments, the entities and observables identification module 122 utilize at least one of a set of built-in features 208 (hereinafter, also referred to as built-in features 208) or the ML model 128 to identify the one or more entities 210A and the one or more observables 210B associated with the generated enriched alert 206. In one embodiment, the built-in features 208 corresponds to pre-determined features of the generated enriched alert 206. In another embodiment, the built-in features 208 may be extracted from the ML model 128. In an example, the built-in features 208 may include user names, field names, and the like.

The ML model 128 may be trained using natural language processing techniques to identify the one or more entities 210A and the one or more observables 210B associated with the generated enriched alert 206. For example, for an entity involved in an incident, different data sources may use different field names, such as "username", "user_name", "user name" and the like. The ML model 128 may be trained to identify all these field names and classify them into a unified field name "User.name" using the natural language processing (NLP) techniques. The NLP techniques are utilized to identify a semantic similarity parameter of the field names. The NLP techniques include but may not be limited to named entity recognition, text summarization, and aspect mining. In general, named entity recognition is used to extract entities in a text. For example, an entity can be any word or series of words that consistently refers to the same thing. Every detected entity is classified into a predetermined category. Named entity recognition identifies entities such as people, locations, organizations, dates, etc. from the text. For example, the named entity recognition might detect the word "super.IoT" in a text and classify it as an "organization". In addition, named entity recognition highlights fundamental concepts and references in the text. In general, text summarization helps summarize large chunks of text. In an example, if an alert contains a number of words in text, text summarization identifies context and creates a summary to identify the semantic similarity parameter. In general, aspect mining identifies different aspects in a text to identify the semantic similarity parameter.

The one or more entities 210A and the one or more observables 210B comprise at least one of information of a user or an attacker associated with the security breach, an asset associated with the security breach, an external host associated with the security breach, a process associated with the security breach, a type of file associated with the security breach, or a registry associated with the security breach of the retrieved incident 106A and the enriched alert 206. In an example, the one or more entities 210A comprise information associated with at least one of: the user or the attacker associated with the security breach, the asset associated with the security breach, and the external host. In an example, the one or more observables 210B includes the process associated with the security breach, the type of file associated with the security breach, or the registry associated with the security breach. In general, the security breach is any incident that results in unauthorized access to computer data, applications, networks or devices. It results in information being accessed without authorization. In an example, information of a user or an attacker associated with the security breach may include user name or identification of the user. In addition, the asset associated with the security breach corresponds to the asset that the user wants to access such as a paper document, a digital document, a database, a password or encryption key or any other digital file. Further, the process associated with the security breach corresponds to a type of security breach technique used by the attacker. The entities and observables identification module 122 outputs the one or more entities 210A, and the one or more observables 210B associated with the enriched alert 206.

Based on the identified one or more entities 210A and the one or more observables 210B, the processor 114 is further configured to generate the behavioral entity model 130 using the modeling engine 124 as explained further in FIG. 2C.

FIG. 2C illustrates a block diagram 200C of the system 102 depicting generation of a behavioral entity model 130, in accordance with an example embodiment. The processor 214 may be configured to generate the behavioral entity model 130 using the modeling engine 124. The modeling engine 124 takes as input the enriched alert 206 along with the one or more entities 210A, and the one or more observables 210B. In addition, the modeling engine 124 utilizes at least one of a response and feedback 212 associated with the user of the system 102, monitoring data 214 associated with the identified one or more entities 210A and the one or more observables 210B for generation of the behavioral entity model 130. In an embodiment, the modeling engine 124 may be configured to utilize the identified one or more entities 210A, the one or more observables 210B, and monitoring data 214 associated with the identified one or more entities 210A and the one or more observables 210B for generation of the behavioral entity model 130.

The modeling engine 124 is configured to generate the behavioral entity model 130 based on the generated enriched alert 206 and the identified one or more entities 210A and the one or more observables 210B along with at least one of the response and feedback 212 and the monitoring data 214. The response and feedback 212 is associated with the user of the system 102 such as security analyst. In an example, the response and feedback 212 may correspond to the user's approach to manage the retrieve incident 106A. In addition, the monitoring data 214 corresponds to information associated with the alert 106A', the one or more entities 210A, and the one or more observables 210B that is monitored by the user of the system 102. In an embodiment, the monitoring data includes at least one of vulnerability scanning data associated with the enriched alert, past data associated with the alert, and recent alerts associated with the retrieved incident 106A. In an embodiment, the processor 114 may be configured to utilize at least one of the response and feedback 212 associated with a user of the system, or the monitoring data associated with the identified one or more entities 210A and the one or more observables 210B to determine the score 112 of the retrieved incident 106A.

The behavioral entity model 130 may comprise vulnerability score, risk score, and stability score associated with the enriched alert of the retrieved incident 106A. In general, vulnerability score is a generic ranking assigned to any given incident 106A that conveys relative urgency of vulnerability of the enriched alert 206 of the incident 106A. Risk score corresponds to a numeric value for probability of exposure, or loss of critical assets and sensitive information, or reputational harm as a result of a cyber-attack or the security breach within an organization's network. Stability score corresponds to a numeric value for stability of a cyber-attack or the security breach.

The behavioral entity model 130 is an output of the modeling engine 124. The behavioral entity model 130 may be further utilized by the score calculation module 126 to determine the final score 112 of the retrieved incident 106A as explained further in FIG. 2D.

FIG. 2D illustrates a block diagram 200D of the system 102 depicting determination of the score 112 for the retrieved incident 106A of the plurality of incidents 106, in accordance with an example embodiment. The score 112 is determined with facilitation of the score calculation module 126. The score calculation module 126 takes as input the enriched alert 206, and the response and feedback 212 of the user of the system 102. In addition, the score calculation module 126 may utilize the behavioral entity model 130 to determine the score 112 of the retrieved incident 106A. In an embodiment, the score calculation module 126 may be configured to perform feature extraction of the retrieved incident 106A using at least one of the enriched alert 206 associated with the retrieved incident 106A, the generated behavioral entity model 130, the response and feedback 212, and an external intelligence data 216 to extract features 214 of the retrieved incident 106A from the input given to the score calculation module 126. The external intelligence data 216 is associated with the security breach. The external intelligence data 216 includes but may not be limited to temporal information, and attack patterns and the like.

The extracted features 214 are extracted from the behavioral entity model 130. The extracted features 214 are associated with the vulnerability score associated with the retrieved incident 106A, the risk score, and the stability score (stored in the behavioral entity model 130) as explained above. In addition, the extracted features 214 includes information about the number of alerts involved in the retrieved incident 106A, the type of alerts involved in the retrieved incident 106A, the one or more observables 210B involved in the retrieved incident, and the number of the one or more entities involved in the retrieved incident 106A. In an embodiment, the score calculation module 126 may be configured to apply the ML model 128 to the extracted features 214 of the retrieved incident 106A to determine the score 112 of the retrieved incident 106A. The determined score 112 is used to help the user of the system 102 to manage or deal with the retrieved incident 106A. In an example, managing of the retrieved incident 106A may be prioritized by the user if the determined score 112 is higher than a threshold value. In addition, management of the retrieved incident 106A may be delayed by the user if the determined score 112 is less than the threshold value. The threshold value is calculated by the ML model 128 based on past set of data associated with the plurality of incidents 106.

In an embodiment, the ML model 128 is trained based on past alerts and incidents history, past response and feedback of the user associated with the system 102, and the external intelligence data 216 to determine the score 112 of the retrieved incident 106A. Further, the score 112 is dynamically updated by the score monitor 132. The score monitor 132 may be configured to dynamically update the determined score 112 for the retrieved incident 106A based on an analysis of at least the retrieved incident 106A and the generated behavioral entity model 130 (further explained in FIG. 2E).

FIG. 2E illustrates a block diagram 200E of the system 102 depicting monitoring of the determined score 212 for the retrieved incident 106A using the score monitor 132, in accordance with an example embodiment. In an embodiment, the score monitor 132 may be configured to monitor changes to at least one of the retrieved incident 106A or a set of incidents 218 (retrieved from the plurality of incidents 106), the behavioral entity model 130, and the response and feedback 212 of the user of the system 102 associated with the retrieved incident 106A.

The score monitor 132 notifies the score calculation module 126 when any change is monitored. The score calculation module 126 may be configured to update the score 112 of the set of incidents 218 based on the notifications received from the score monitor 132. In an example, the system 102 keeps receiving the external intelligence data 216 (as shown in FIG. 2D) associated with the security breach or threat to the system 102 which is utilized to dynamically update the score 112 of the set of incidents 218. The external intelligence data 216 includes data related to emerging threats (such as new attack campaigns), threat groups, and zero-day exploits.

In an example, the score monitor 132 keeps monitoring behavior of the one or more entities 210A with data from different sources to assist the score calculation module 126 in dynamic updating of the score 112. In an example, the dynamic updating of the score 112 gives the most severe incident of the set of incidents 218 higher ranking based on the response and feedback 212 already taken from the user, entity behavior changes and the external intelligence data 216. The score calculation module 126 is a machine learning driven module that leverages machine learning techniques in several steps in scoring the set of incidents 218 to reduce human modeling efforts and improve performance.

The dynamic update of the score 112 of the set of incidents 218 enables the user associated with the system 102 (such as security analyst) to focus on the most severe incident first. Based on the dynamic update of the score 112, the user may prioritize managing each of the set of incidents 218. In an example, the user may delay managing an incident having the score 112 lesser than the threshold value and manage the incident having the score 112 higher than the threshold value. Further, the dynamic update of the score 112 enables the user to manage each of the set of incidents 218 in time.

Figure 3:
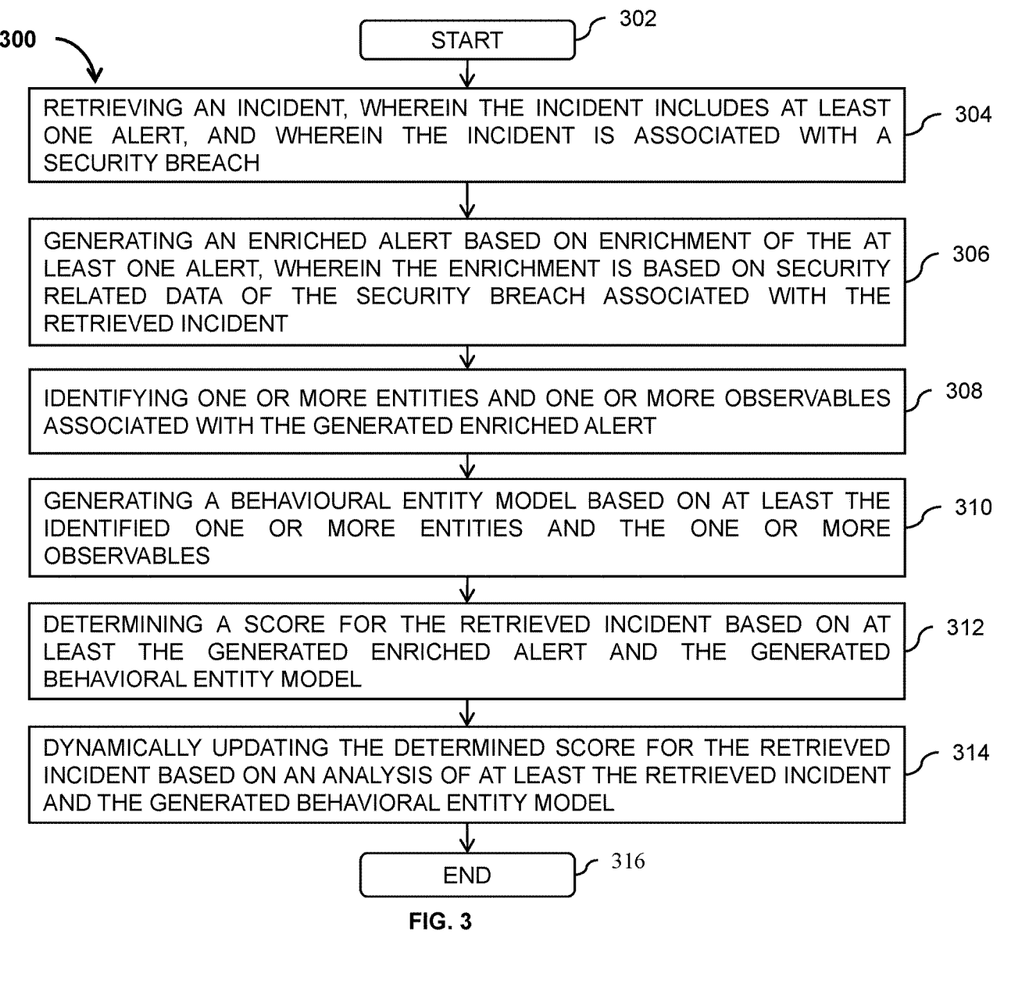
FIG. 3 illustrates a flow chart of a method for dynamic scoring of the plurality of incidents, in accordance with an example embodiment.

The system 102 may determine the score 112 for the set of incidents 218 or the retrieved incident 106A by performing a step-by-step method as explained in FIG. 3.

FIG. 3 illustrates a flow chart 300 of a method for dynamic scoring of the plurality of incidents 106 (or the set of incidents 218), in accordance with an example embodiment. It may be noted that each block of the flow chart 300 of the method is explained in reference to the FIGS. 1A-2F. It will be understood that each block of the flow chart 300 of the method may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 116 of the system 102, employing an embodiment of the present invention and executed by a processor 114. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow chart 300, and combinations of blocks in the flow diagram 300, may be implemented by special purpose hardware-based computer systems which perform the specified functions, or combinations of special purpose hardware and computer instructions. The method illustrated by the flow chart 300 of FIG. 3 is generating the automated incident 112. Fewer, more, or different steps may be provided.

The method initiates at step 302. Following step 302, at step 304, the method comprises retrieving the incident 106A of the plurality of incidents 106 received from the plurality of heterogeneous sources 104 (as explained in FIG. 1A). The processor 114 may be configured to retrieve the incident 106A of the plurality of incidents 106 extracted from the plurality of heterogeneous sources 104. The plurality of heterogeneous sources 104 includes but may not be limited to firewall, endpoint detection and response (EDR) tool, and network detection and response (NDR) tool (as explained in FIG. 1A).

At step 306, the method comprises generating the enriched alert 206 based on enrichment of the alert 106A' (also referred as raw alert 202). The enrichment is based on the security related data of the security breach associated with the retrieved incident 106A. The method further comprises identifying the predefined rules 204 associated with the security related data of the security breach associated with the retrieved incident. The security related data corresponds to at least one of: a tactic of the security breach, a technique of the security breach, a kill chain stage of the security breach, a severity of the security breach, a fidelity associated with the at least one alert 106A', or a likelihood of successfulness of the security breach. The method further comprises enrichment of the at least one alert 106A' based on the identified predefined rules 204 (as explained in FIG. 2A). If the predefined rules 204 are unidentified, the method includes a step of applying the ML model 128 on the alert 106A' of the retrieved incident 106A to output the enriched alert 206.

At step 308, the method comprises identifying the one or more entities 210A and the one or more observables 210B associated with the generated enriched alert 206 using the entities and observables identification module 122 as explained in FIG. 2B. In an example, the one or more entities 210A comprise information associated with at least one of: the user or the attacker associated with the security breach, the asset associated with the security breach, and the external host. In an example, the one or more observables 210B includes the process associated with the security breach, the type of file associated with the security breach, or the registry associated with the security breach. (as explained in FIG. 2B). The method further comprises utilizing at least one of: the set of built-in features or the machine learning (ML) model 128 to identify the one or more entities 210A and the one or more observables 210B associated with the generated enriched alert 206.

The ML model 128 may be trained using natural language processing (NLP) techniques to identify the one or more entities 210A and the one or more observables 210B associated with the generated enriched alert. For example, for an entity involved in an incident, different data sources may use different field names, such as "username", "user_name", "user name" and the like. The ML model 128 may be trained to identify all these field names and classify them into a unified field name "User.name" using the natural language processing (NLP) techniques. The NLP techniques are utilized to identify a semantic similarity parameter of the field names. The NLP techniques include but may not be limited to named entity recognition, text summarization, and aspect mining. In general, named entity recognition is used to extract entities in a text. For example, an entity can be any word or series of words that consistently refers to the same thing. Every detected entity is classified into a predetermined category. Named entity recognition identifies entities such as people, locations, organizations, dates, etc. from the text. For example, the named entity recognition might detect the word "super.IoT" in a text and classify it as an "organization". In addition, named entity recognition highlights fundamental concepts and references in the text. In general, text summarization helps summarize large chunks of text. In an example, if an alert contains a number of words in text, text summarization identifies context and creates a summary to identify the semantic similarity parameter. In general, aspect mining identifies different aspects in a text to identify the semantic similarity parameter.

The identified one or more entities 210A and the one or more observables 210B may be further utilized by the modeling engine 124. At step 310, the method comprises generating the behavioral entity model 130 based on at least the identified one or more entities 210A and the one or more observables 210B using the modeling engine 124 (as explained in FIG. 2C). The generation of the behavioral entity model 130 includes utilizing the identified one or more entities 210A, the one or more observables 210B, and the monitoring data 214 associated with the identified one or more entities 210A and the one or more observables 210B. The monitoring data 214 may comprise at least one of vulnerability scanning data associated with the enriched alert 206, past data associated with the alert 106A', and recent alerts associated with the retrieved incident 106A.

At step 312, the method comprises determining the score 112 for the retrieved incident 106A based on at least the generated enriched alert 206 and the generated behavioral entity model 130. The score 112 is determined with facilitation of the score calculation module 126. The score calculation module 126 takes as input the enriched alert 206, and the response and feedback 212 of the user of the system 102. In addition, the score calculation module 126 utilizes the behavioral entity model 130 to determine the score 112 of the retrieved incident 106A. In an embodiment, the score calculation module 126 may be configured to perform feature extraction of the retrieved incident 106A using at least one of: the enriched alert 206 associated with the retrieved incident 106A, the generated behavioral entity model 130, the response and feedback 212, and the external intelligence data 216 to extract features 214 of the retrieved incident 106A from the input given to the score calculation module 126. The external intelligence data 216 is associated with the security breach. The external intelligence data 216 includes but not limited to temporal information, and attack patterns and the like (as explained in FIG. 2D).

At step 314, the method includes dynamically updating the determined score 112 for the retrieved incident 106A based on an analysis of at least the retrieved incident 106A and the generated behavioral entity model 130. In an embodiment, for dynamically updating the determined score, the method includes monitoring changes to at least one of: the retrieved incident 106A, the behavioral entity model 130, and the response and feedback 212 of the user of the system 102 associated with the retrieved incident 106A using the score monitor 132. The score monitor may be configured to monitor changes to dynamically update the determined score 112 for the retrieved incident 106A (as explained in FIG. 2E). In addition, the score monitor 132 notifies the score calculation module 126 when any change is monitored. In an embodiment, the score calculation module 126 may be configured to update the score 112 for the set of incidents 218 based on the notifications received from the score monitor 132. In an example, the system 102 keeps receiving the external intelligence data 216 (as shown in FIG. 2D) associated with the security breach or threat to the system 102 which is utilized to dynamically update the score 112 of the set of incidents 218.

The score 112 is sent to the user device 110 to help the user associated with the system in attack comprehension, investigation, and management.

The method terminates at step 316.

In conventional systems, the alerts are received from one or more homogeneous sources only, which may lead to non-detection of the attack activities from other sources.

Moreover, in some scenarios, a large number of the received alerts may lead to the phenomenon known as the alert fatigue. The alert-fatigue may cause the analysis of the alerts challenging for the user, such as the security analyst. To combat alert fatigue from multiple threat alerts, security analysts may use manual ways to create security incidents from the threat alerts. After an incident is created, a cybersecurity analyst manually investigates the context around the security incident and takes proper actions to minimize the impacts of the security incident. As the resources and time of security analysts are limited, it is important for them to prioritize their efforts to respond to more severe security incidents first instead of manually going through every alert or incident (alert group). It is a tedious task for security analysts to manually analyze the security incidents. Also, manual analyzing of the security incidents is time consuming. On the other hand, the system 102 receives alerts from heterogeneous sources and retrieves incidents based on the alerts. The system 102 of the present disclosure performs dynamic scoring of the set of incidents 218 that enables the user associated with the system 102 (such as security analyst) to focus on the most severe incident first. Based on the dynamic update of the score 112, the user may prioritize managing each of the set of incidents 218. In an example, the user may delay managing an incident having the score 112 lesser than the threshold value and manage the incident having the score 112 higher than the threshold value. Further, the dynamic update of the score 112 enables the user to manage each of the set of incidents 218 in time.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

We claim:

1. A system for dynamic scoring of a plurality of incidents, the system comprising:
   at least one non-transitory memory configured to store computer executable instructions; and
   at least one processor configured to execute the computer executable instructions to:
      retrieve an incident of the plurality of incidents, wherein the incident comprises at least one alert, and wherein the incident is associated with a security breach;

generate an enriched alert based on enrichment of the at least one alert, wherein the enrichment is based on security related data of the security breach associated with the retrieved incident;

identify one or more entities and one or more observables associated with the generated enriched alert;

generate a behavioural entity model based on at least the identified one or more entities and the one or more observables;

determine a score for the retrieved incident based on at least the generated enriched alert and the generated behavioural entity model; and dynamically update the determined score for the retrieved incident based on an analysis of at least the retrieved incident and the generated behavioural entity model.

2. The system of claim 1, wherein for the enrichment of the at least one alert, the at least one processor is further configured to:

identify predefined rules associated with the security related data of the security breach associated with the retrieved incident, wherein the security related data corresponds to at least one of: a tactic of the security breach, a technique of the security breach, a kill chain stage of the security breach, a severity of the security breach, a fidelity associated with the at least one alert, or a likelihood of successfulness of the security breach; and generate the enriched alert based on the identified predefined rules.

3. The system of claim 2, wherein for the enrichment of the at least one alert, the at least one processor is further configured to:

apply a machine learning (ML) model on the at least one alert, based on unsuccessful identification of the predefined rules, to output the enriched alert, wherein the ML model is trained to enrich the at least one alert based on the security related data of the security breach associated with the retrieved incident.

4. The system of claim 1, wherein to identify the one or more entities and the one or more observables, the at least one processor is further configured to:

utilize at least one of: a set of built-in features or a machine learning (ML) model to identify the one or more entities and the one or more observables associated with the generated enriched alert, wherein the ML model is trained using natural language processing techniques to identify the one or more entities and the one or more observables associated with the generated enriched alert.

5. The system of claim 4, wherein the one or more entities and the one or more observables comprises at least one of: information of a user associated with the security breach, an asset associated with the security breach, an external host associated with the security breach, a process associated with the security breach, a type of file associated with the security breach, or a registry associated with the security breach of the retrieved incident.

6. The system of claim 1, wherein to generate the behavioural entity model, the at least one processor is configured to:

utilize the identified one or more entities, the one or more observables, and monitoring data associated with the identified one or more entities and the one or more observables, wherein the monitoring data comprises at least one of: vulnerability scanning data associated with the enriched alert, past data associated with the alert, and recent alerts associated with the retrieved incident.

7. The system of claim 1, wherein the least one processor is further configured to:

utilize at least one of: a response and a feedback associated with a user of the system, or monitoring data associated with the identified one or more entities and the one or more observables to determine the score of the retrieved incident.

8. The system of claim 1, wherein to determine the score of the retrieved incident, the at least one processor is configured to:

perform feature extraction of the retrieved incident using at least one of: the enriched alert associated with the retrieved incident, the generated behavioural entity model, a response, and feedback associated with a user of the system, and an external intelligence data;

apply a machine learning (ML) model to the extracted features of the retrieved incident to determine the score of the retrieved incident.

9. The system of claim 1, wherein to dynamically update the determined score, the at least one processor is configured to:

monitor changes to at least one of: the retrieved incident, the behavioural entity model, and a response and feedback of a user of the system associated with the retrieved incident.

10. A method for dynamic scoring of a plurality of incidents, the method comprising:

retrieving an incident of the plurality of incidents, wherein the incident includes at least one alert, and wherein the incident is associated with a security breach;

generating an enriched alert based on enrichment of the at least one alert, wherein the enrichment is based on security related data of the security breach associated with the retrieved incident;

identifying one or more entities and one or more observables associated with the generated enriched alert;

generating a behavioural entity model based on at least the identified one or more entities and the one or more observables;

determining a score for the retrieved incident based on at least the generated enriched alert and the generated behavioural entity model; and dynamically updating the determined score for the retrieved incident based on an analysis of at least the retrieved incident and the generated behavioural entity model.

11. The method of claim 10, further comprising:

identifying predefined rules associated with the security related data of the security breach associated with the retrieved incident, wherein the security related data corresponds to at least one of: a tactic of the security breach, a technique of the security breach, a kill chain stage of the security breach, a severity of the security breach, a fidelity associated with the at least one alert, or a likelihood of successfulness of the security breach; and generating the enriched alert based on the identified predefined rules.

12. The method of claim 11, further comprising:

applying a machine learning (ML) model on the at least one alert, based on unsuccessful identification of the predefined rules, to output the enriched alert, wherein the ML model is trained to enrich the at least one alert based on the security related data of the security breach associated with the retrieved incident.

13. The method of claim 10, further comprising:
utilizing at least one of: a set of built-in features or a machine learning (ML) model to identify the one or more entities and the one or more observables associated with the generated enriched alert, wherein the ML model is trained using natural language processing techniques to identify the one or more entities and observables associated with the generated enriched alert.

14. The method of claim 13, wherein the one or more entities and the one or more observables comprises at least one of: information of a user associated with the security breach, an asset associated with the security breach, an external host associated with the security breach, a process associated with the security breach, a type of file associated with the security breach, or a registry associated with the security breach of the retrieved incident.

15. The method of claim 10, further comprising:
utilizing the identified one or more entities and monitoring data associated with the identified one or more entities and the one or more observables, wherein the monitoring data comprises at least one of: vulnerability scanning data associated with the enriched alert, past data associated with the alert, and recent alerts associated with the retrieved incident.

16. The method of claim 10, further comprising:
performing feature extraction of the retrieved incident using at least one of: the enriched alert associated with the retrieved incident, the generated behavioural entity model, a response, and feedback associated with a user of the system, and an external intelligence data;
applying a machine learning (ML) model to the extracted features of the retrieved incident to determine the score of the retrieved incident.

17. The method of claim 10, further comprising:
monitoring changes to at least one of: the retrieved incident, the behavioural entity model, and a response and feedback of a user of the system associated with the retrieved incident to dynamically update the determined score for the retrieved incident.

18. A computer programmable product comprising a non-transitory computer readable medium having stored thereon computer executable instruction which when executed by at least one processors, cause the at least one processor to carry out operations for dynamic scoring of a plurality of incidents, the operations comprising:
retrieving an incident, wherein the incident includes at least one alert, and wherein the incident is associated with a security breach;
generating an enriched alert based on enrichment of the at least one alert, wherein the enrichment is based on security related data of the security breach associated with the retrieved incident;
identifying one or more entities and one or more observables associated with the generated enriched alert;
generating a behavioural entity model based on at least the identified one or more entities and the one or more observables;
determining a score for the retrieved incident based on at least the generated enriched alert and the generated behavioural entity model; and
dynamically updating the determined score for the retrieved incident based on an analysis of at least the retrieved incident and the generated behavioural entity model.

* * * * *